United States Patent
Ashworth

(10) Patent No.: US 6,722,663 B1
(45) Date of Patent: Apr. 20, 2004

(54) SEAL ARRANGEMENT

(75) Inventor: Roger Phillip Ashworth, Loughborough (GB)

(73) Assignee: Lattice Intellectual Property LTD (GB)

( * ) Notice: Subject to any disclaimer, the term of this patent is extended or adjusted under 35 U.S.C. 154(b) by 56 days.

(21) Appl. No.: 10/018,055

(22) PCT Filed: Jun. 12, 2000

(86) PCT No.: PCT/GB00/02113

§ 371 (c)(1), (2), (4) Date: Mar. 19, 2002

(87) PCT Pub. No.: WO00/79158

PCT Pub. Date: Dec. 28, 2000

(30) Foreign Application Priority Data

Jun. 17, 1999 (GB) ............................................ 9914008

(51) Int. Cl.[7] ................................................ F16L 17/00
(52) U.S. Cl. .......................................... 277/602; 285/10
(58) Field of Search ................................. 277/602, 927; 285/100, 96, 106; 137/318, 317; 138/97

(56) References Cited

U.S. PATENT DOCUMENTS

| 3,047,270 A | * | 7/1962 | Moore, Jr. | ............... 254/134.6 |
|---|---|---|---|---|
| 4,821,799 A | * | 4/1989 | Wong | ........................ 166/84.2 |
| 4,894,009 A | * | 1/1990 | Kramer et al. | ................. 432/64 |
| 5,084,764 A | * | 1/1992 | Day | ............................. 348/84 |
| 5,181,668 A | * | 1/1993 | Tsuji et al. | .................. 242/387 |
| 5,433,236 A | * | 7/1995 | Zollinger et al. | ............... 137/1 |
| 5,892,163 A | * | 4/1999 | Johnson | ..................... 73/865.8 |

FOREIGN PATENT DOCUMENTS

| DE | 3407048 A1 | * | 9/1985 |
| DE | 3832716 A1 | * | 4/1990 |
| DE | 19607267 C1 | * | 7/1997 |
| GB | 2255140 A | * | 10/1992 |

* cited by examiner

Primary Examiner—William L. Miller
(74) Attorney, Agent, or Firm—Stites & Harbison PLLC; Marvin Petry

(57) ABSTRACT

A running fluid seal arrangement (10) includes a passage for receiving cable (12) with chambers (20,21 and 22). Water at a higher pressure than gas in main (11) is pumped via pump (26) into chamber (21) from a reservoir (27). A mixture of gas and water from the interface in the region of chamber (20) is passed to a sealed pressure vessel (28). Water therefrom can pass back to reservoir via float valve (29). Wiper seals (30,36 and 37) can also be provided.

12 Claims, 5 Drawing Sheets

US 6,722,663 B1

SEAL ARRANGEMENT

FIELD OF THE INVENTION

The invention relates to a seal arrangement and method which provides a very low friction mechanism.

BACKGROUND OF THE INVENTION

In pipe inspection techniques, for example, there is a need to insert long lengths of cable, hoses, umbilicals or the like into the pipe and arrange for these to be towed or otherwise transported through the pipeline. The term 'cable' hereinafter is intended to encompass all such elongate flexible members.

In the case of fluid carrying pipelines, such as natural gas pipelines, it is necessary to seal the cable at the entry point to prevent loss of fluid carried in the pipe, i.e. 'live' pipeline conditions.

In the past, poor sealing occurred due to debris on the cable. If a tighter seal was utilised, then the greater degree of friction occurred limiting the effectiveness of cable travel, which may be required to be several hundred meters in length through the pipeline.

SUMMARY OF THE INVENTION

The invention is concerned with overcoming such disadvantages to provide a running seal that is fluid tight.

According to the invention there is provided a seal arrangement for a cable including means for providing a first fluid at a first pressure to counter a second fluid at a second pressure in a duct receiving the cable to provide a low friction barrier seal as the cable moves or is utilised through the duct.

Further according to the invention there is provided a method of sealing a cable passing through an aperture in a duct the method comprising: applying and maintaining a first fluid pressure around the cable to counter a second fluid pressure present in the duct to provide a barrier seal.

BRIEF DESCRIPTION OF THE DRAWINGS

The invention will now be described by way of example with reference to the accompanying drawings in which.

EMBODIMENTS

Figure 1:
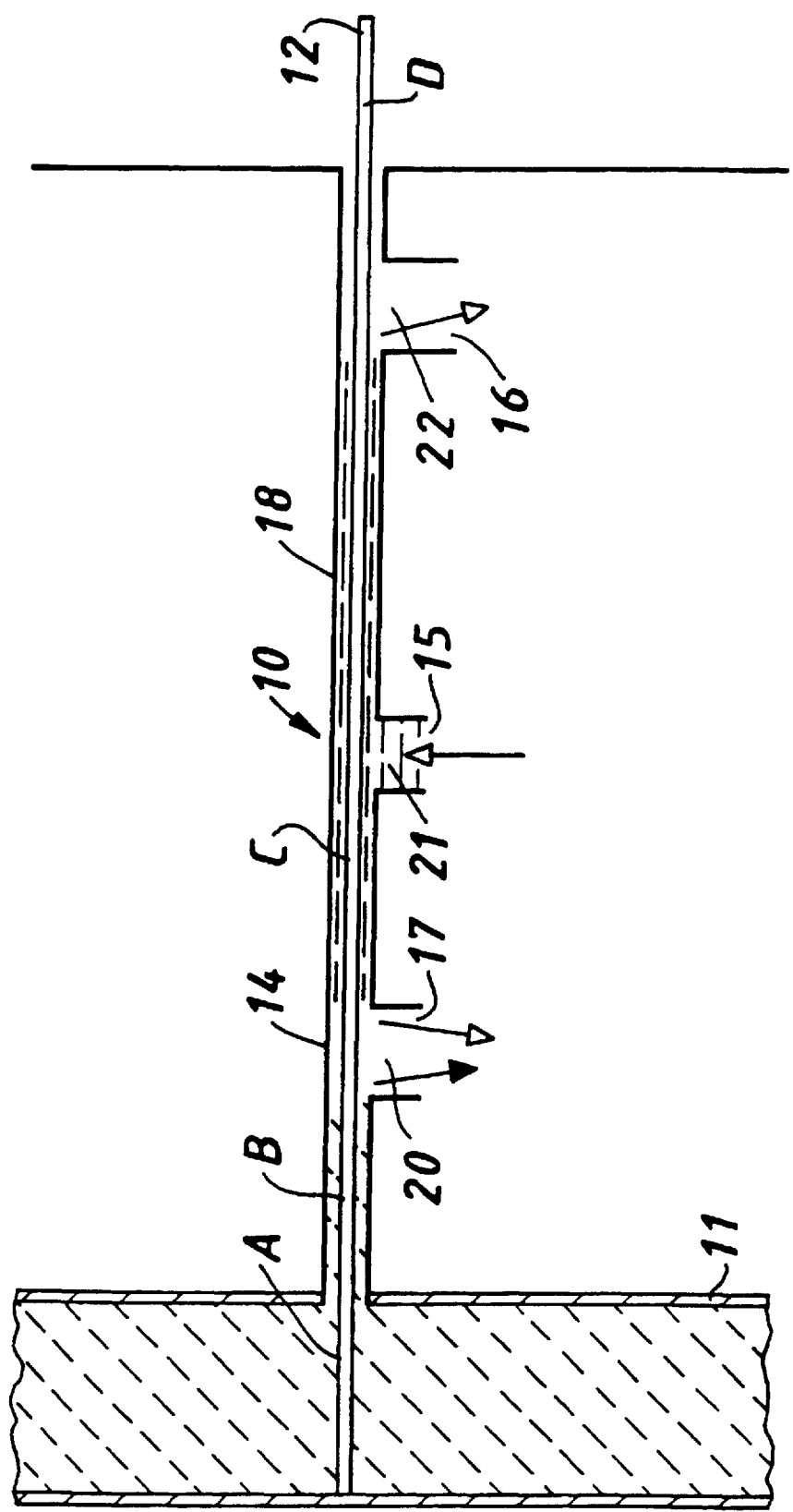
FIG. 1 shows a schematic diagram of a basic seal arrangement with a fluid seal.

The arrangement of FIG. 1 shows, in schematic form, the basic operation of the very low friction running seal pressure barrier mechanism 10 of the invention. A pipeline 11 contains gas from source at a pressure of 2 bar, in this example. A cable 12 passing through the seal mechanism 10 has a portion A in the pipeline surrounded by the gas at 2 bar. The portion B of the cable is adjacent a fluid interface 14 within the seal but is also surrounded by gas at 2 bar pressure. The cable portion C in the seal mechanism 10 is adjacent the fluid interface and is surrounded by water at a pressure of 3 bar, the pressurised water entering into the seal at entry 15. The portion D of the cable external of the seal is at atmospheric, pressure. Water at atmospheric pressure is removed at exit 16 from the seal mechanism 10.

A mixture of gas and water is removed from the fluid interface at exit 17, the pressure thereof being in the region of 2–3 bar.

The cable, which may be towing or providing other services to in-pipe tools, may be moving at speeds up to 10 meters/minute either in or out, and may have a very poor outer sealing surface (e.g. a stranded hawser). The cable surface may also be heavily contaminated from in-pipe debris. Apart from providing a gas seal at typical working pressures, the seal has low friction in order to minimise the build of tension on the in-pipe cables when passing bends and the very long lengths utilised. The seal can be employed for cable passages greater than 400 meters.

The seal mechanism 10 operates by utilising a fluid (i.e. water) barrier. This fulfils sealing, lubrication (low friction) and cleaning of the cable all in one. This has been effected whilst avoiding significant water ingress into the gas main.

The cable passes through a long clearance tube 18 forming part of the seal mechanism, around thirty cable diameters long and with typically 5% clearance on diameter. The assembly with the tube drilling is split along its axis, enabling quick and easy assembly/disassembly of the seal even with a cable resident. Along the length of the tube are three chambers 20,21 and 22 with ports. In operation, as mentioned above, the central port 15 is supplied with water at a chamber pressure significantly above the pressure in the gas main. In practice an air operated pump (described later) of around 10 liters/min capacity is sufficient for cables up to 10 mm in diameter and gas pressure up to 2 barg. Water then flows in the annular space in both directions towards the chambers 20, 22. Because the pressure difference is greater, a greater proportion of the total flow is towards the atmospheric end. The water emanating from the atmospheric end is collected in the outer chamber 22 and piped directly back to a supply tank (described later). The chamber 20 at the gas end of the seal is the gas/liquid interface. The water flow into it, which makes the gas seal, is collected in a pressurised sump, which is then automatically emptied by a float valve back to the supply tank, as now described in the more detailed version of FIG. 2.

Figure 2:
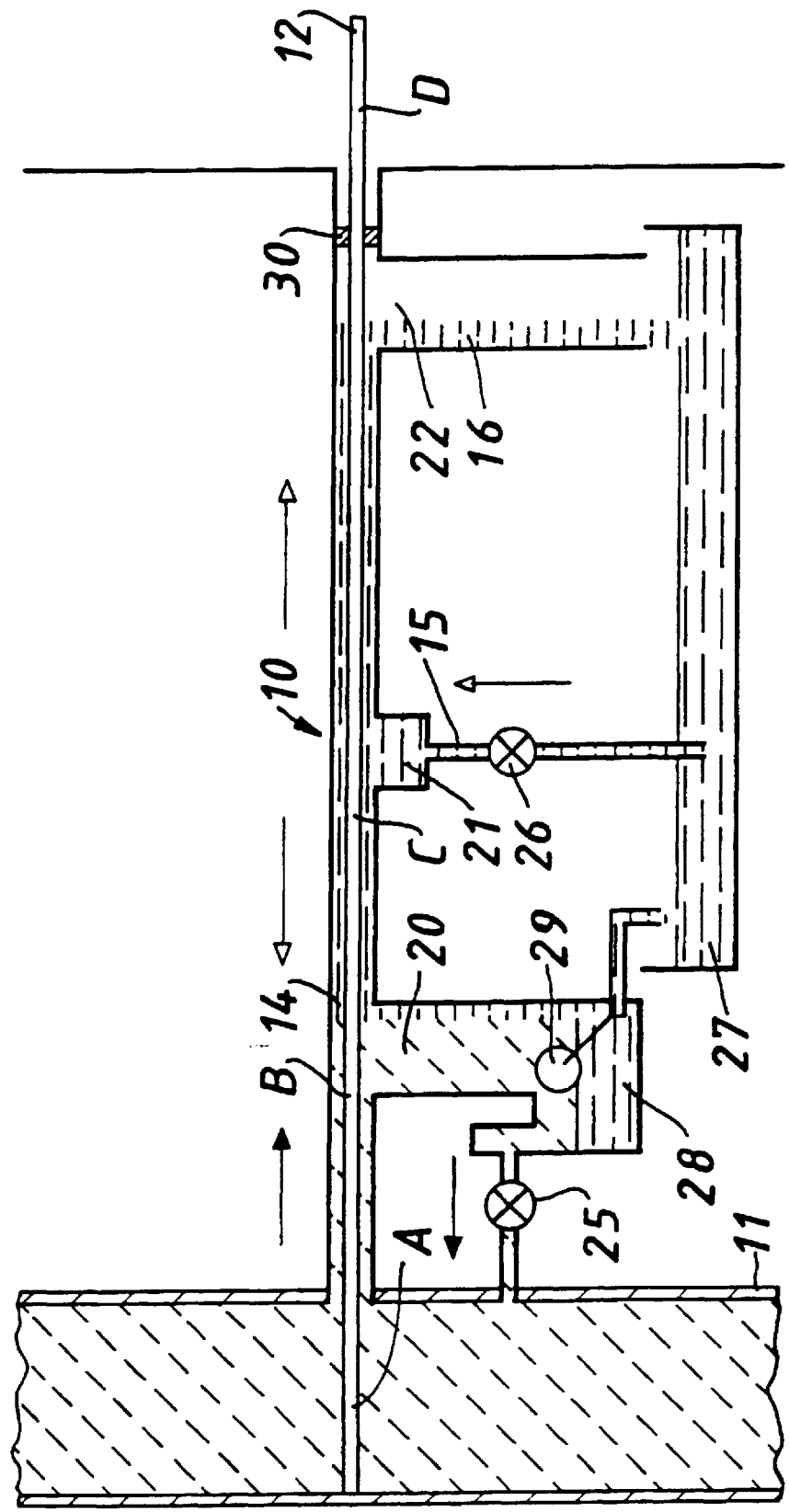
FIG. 2 shows a modified arrangement with additional elements including pumps.

In the modified and expanded version of FIG. 2, a gas pump 25 is provided and also a water pump 26 taking its supply from a supply tank reservoir 27.

The mixture of gas and water from exit 17 is received by a pressurised sump 28. The water is automatically emptied by a float valve 29 when the water level is high to allow it to pass back to the reservoir 27.

In operation, the chamber 20 at the gas end of the seal is maintained at a pressure below the working pressure of the main 11 by the second pump 25 which exhausts gas, separated from the water by a gravity trap, back into the main. By doing this the gas flow coming into the chamber in the annular space around the cable prevents water getting into the main, in the same way as the water seals the annular space in the central portion of the seal. Such an arrangement can achieve the seal with no wiper seals on the cable at all, and as such is a very low friction configuration. In practice a loose wiper seal 30 is typically provided to reduce stray water leakage which may build up from time to time.

Figure 3:
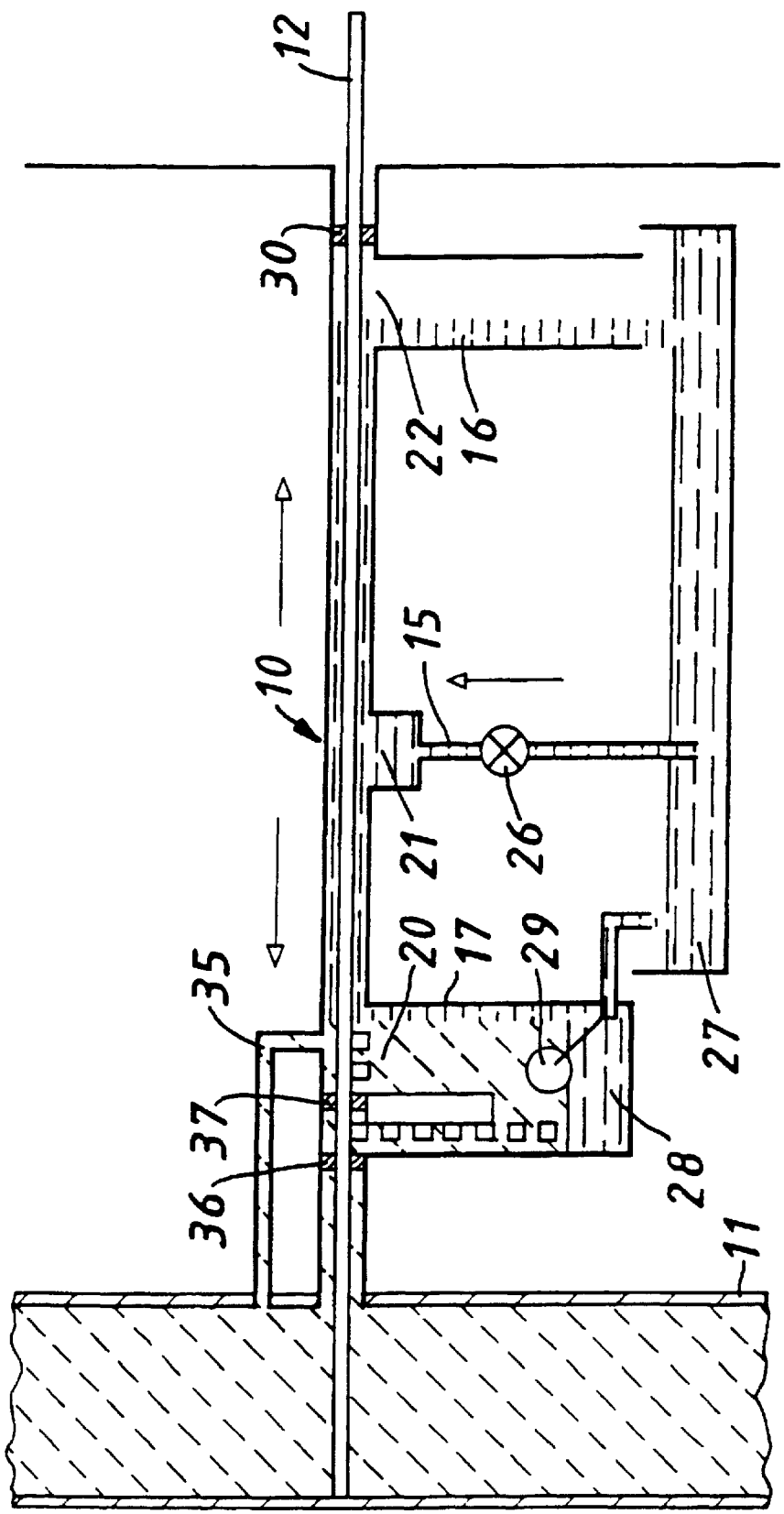
FIG. 3 shows a modified version of FIG. 2 with an additional fluid path and a single pump.

In order to remove the need for the gas pump, a modified arrangement can be utilised as shown in FIG. 3. The pump has been replaced by a 'snorkel' tube 35 to provide pressure equalisation. The tube 35 balances the pressure across a split wiper seal 36,37 placed between the inner chamber. 20 and the gas main 11. Gravity ensures that water is kept away from the snorkel tube port. Since there is no pressure difference between the chamber and the main there is little tendency for water to be driven past the wiper seal. The absence of a pressure difference between the seals 36 and 37 continues to be maintained in use by the tube 35.

Figure 4:
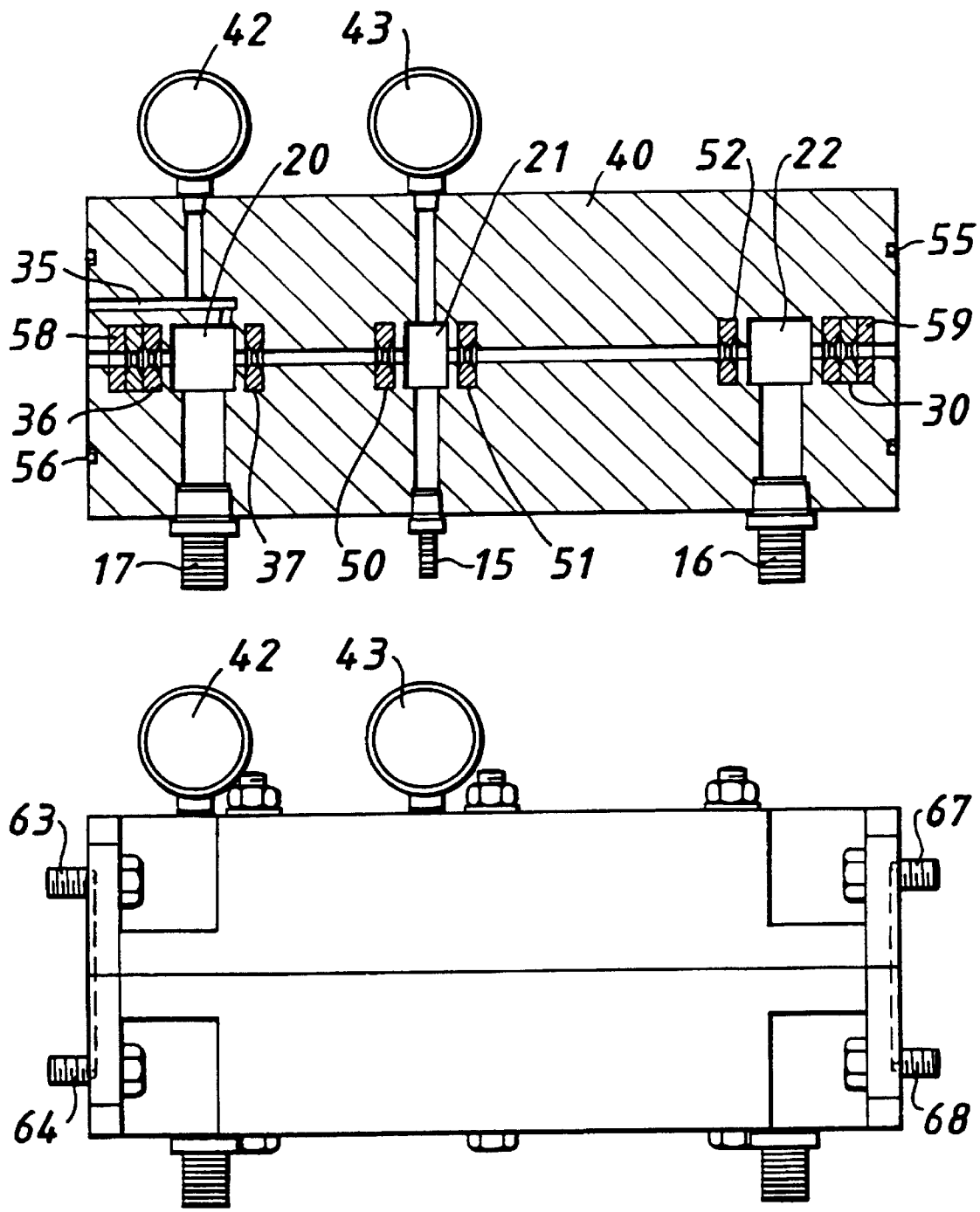
FIG. 4 shows a sectional and non-sectional view of a suitable housing incorporating the seal and associated connections.

The running seal mechanism 10 can be formed within a unitary metal housing as shown in FIG. 4.

The block 40 which can be formed from two diecast halves includes the three chambers 20,21 and 22. The inlet 15 and outlets 16 and 17 are incorporated to be connected to the sump 28 and reservoir 27. A pressure gauge 42 monitors the pressure in chamber 20 and a further pressure gauge 43 monitors pressure in chamber 21. Wiper seal 30 is shown to the left of chamber 22 and can be of tapering section towards the cable and is typically formed of nitrile rubber or polyurethane. Other wiper seals 50,51 are provided in this embodiment.

The outermost split seals 58, 59 are hardened steel guides provided to ensure cable alignment and to prevent wear of the clearance bore. The inner seals are an option to reduce water circulation and pumping requirements.

The snorkel 35 is provided as a passage in the housing. O-ring seals 55,56 are utilised to seal the housing to a launch tube flange end (not shown) which typically provides access to the main. A plate valve (not shown) of the type allowing cable access can be provided upstream of the running seal to allow isolation to be effected. Each end can be connected using four bolts, two of these 63,64 and 67,68 being shown in the view in the diagram.

Figure 5:
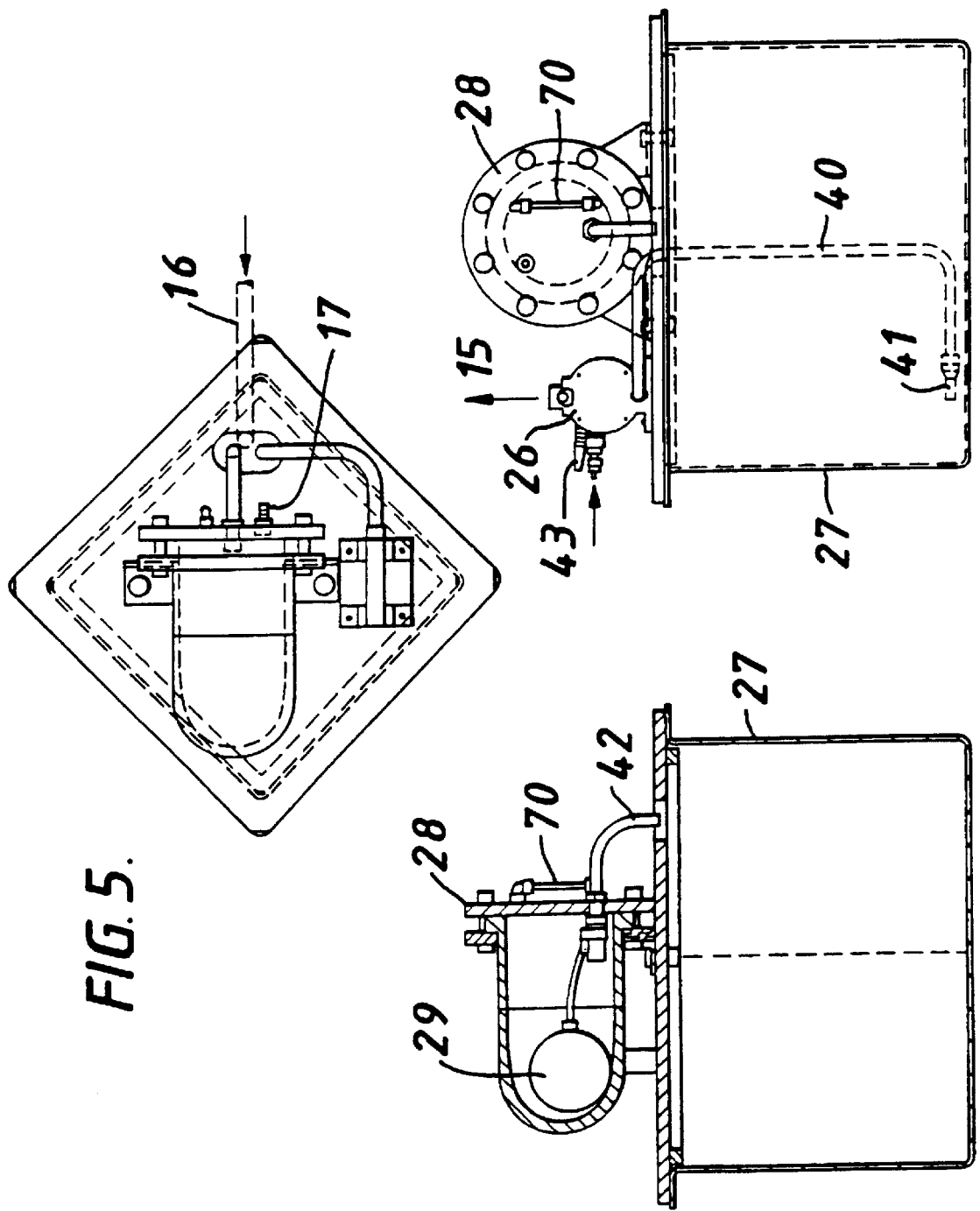
FIG. 5 shows several views of a water receiver and holding tank for use with the FIG. 4 arrangement.

The reservoir 27 and pressurised sump 28 are shown in FIG. 5.

The pump 26 for reservoir 27 includes suction pipe 40 with filter 41. The pressurised vessel 28 includes valve with float 29 to allow water to exhaust via tube 42 into reservoir 27. A suitable source of air supply for powering the pump is provided at power input 43. The pressurised water for inlet 15 is then available. A transparent pipe 70 allows a visual indication of the water level in vessel 28.

What is claimed is:

1. A seal arrangement for a cable including means for providing a first fluid at a first pressure to counter a second fluid at a second pressure in a duct receiving the cable to provide a low friction barrier seal around said cable as the cable moves or is utilized through the duct, reservoir means for providing a source of said first fluid, pump means for pressuring the first fluid to the first pressure for the seal and means for returning the first fluid from the seal to the reservoir.

2. An arrangement as claim in claim 1 including a chamber for providing a fluid interface for the first and second fluids and means for separating the first and second fluids to allow the first fluid content to be returned for utilization.

3. An arrangement as claimed in claim 2 including passage means for providing pressure equalization between the duct and the chamber providing the fluid interface.

4. An arrangement as claimed in claim 1 including at least one wiper device for preventing the first fluid passing into the duct and/or externally of the seal arrangement.

5. An arrangement as claimed in claim 1 including first and second pressure monitoring means for ensuring that the first pressure is maintained above the second pressure, in use.

6. An arrangement as claimed in claim 1 including a housing having first, second and third chambers, the first chamber being configured as a fluid interface for the first and second fluids, the second chamber being configured as an entry for the first pressurized fluid and the third chamber being configured as an exit for the first fluid at a reduced pressure.

7. A method of sealing a cable passing through an aperture in a duct, the method comprising:

maintaining first fluid pressure around the cable to counter a second fluid pressure present in the duct to provide a barrier seal, whilst still allowing the cable to move through the duct, providing a reservoir as a source of the first fluid, pressurizing the first fluid from the reservoir to the first pressure for the barrier seal and returning the first fluid from the barrier seal to the reservoir after passage along the outside of the cable whilst acting as the barrier seal.

8. A method as claimed in claim 7 including providing a fluid interface for the first and second fluids and separating the first and second fluids to allow the first fluid to be returned for utilization.

9. A method as claimed in claim 8 including the step of providing pressure equalization between the duct and the fluid interface.

10. A method as claimed in claim 7 including the step of providing a wiping fluid barrier for prevent the first fluid passing into the duct and/or externally of the seal.

11. A method as claimed in claim 7 including monitoring the first and second fluid pressures to ensure the first pressure is maintained above the second pressure.

12. A method as claimed in claim 7 including the steps of providing a first chamber configured as a fluid interface for the first and second fluids, providing a second chamber configured as an entry for the first pressurized fluid and providing a third chamber configured as an exit for the first fluid at a reduced pressure.

* * * * *